Aug. 6, 1940.    L. H. L. TRONSTAD    2,210,862
DEVICE FOR DRYING THE INSIDE OF SHOES AND BOOTS
Filed Jan. 28, 1939
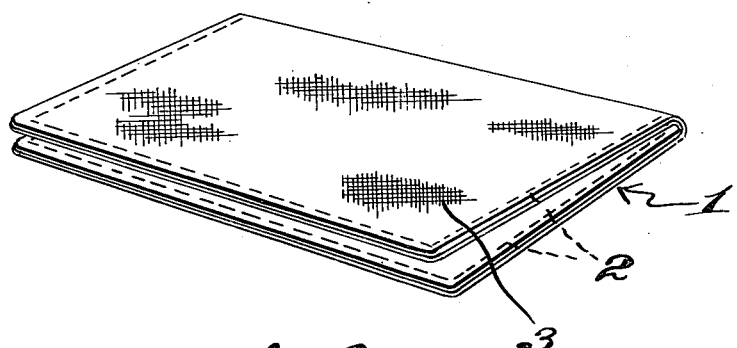
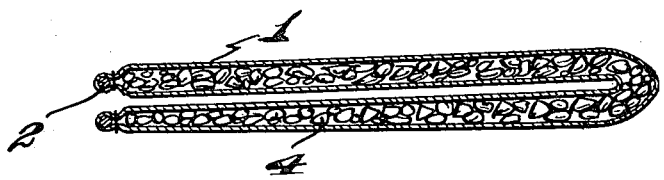
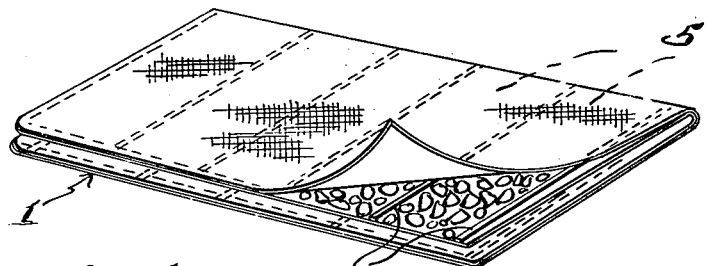
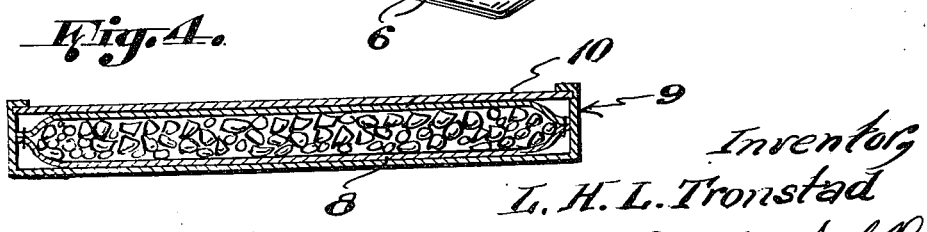
Inventor
L. H. L. Tronstad
Glascock Downing & Seebold
By:    Attys.

Patented Aug. 6, 1940

2,210,862

UNITED STATES PATENT OFFICE 2,210,862

DEVICE FOR DRYING THE INSIDE OF SHOES AND BOOTS

Leif Hans Larsen Tronstad, Trondheim, Norway

Application January 28, 1939, Serial No. 253,455
In Norway January 29, 1938

3 Claims. (Cl. 34—1)

Shoes and boots should as well known be dried without using strong heat and preferably from inside. Especially this is the matter when drying rubber shoes.

Fig. 1 is a view in perspective illustrating my device.

Fig. 2 is a sectional view thereof.

Fig. 3 is a perspective view illustrating a modified form of the drying device and, Fig. 4 is a view illustrating an airtight case for keeping the device dry when not in use.

The present invention relates to a device for drying shoes and boots from inside by means of a carrier 1 having a penetrable surface and containing a hygroscopic substance capable of reactivation placed into cells produced by arrangement of ribs 2 in the carrier. As an example the carrier 1 may be suitably covered by wire gauze 3. The bearer may consist suitably of aluminium owing to its high heat conducting power and its small tendency of corrosion. A hygroscopical substance 4 preferably silica gel or activated alumina is used, the advantages of such materials being that they may be regenerated.

The said hygroscopical substances may in dried state absorb humidity up to 25 to 30 percent of their weight. The bearer may be regenerated by being removed from the shoe or boot and placed on a cooking plate, in a roasting furnace or near to an open fire so as to be dried again. The drying effect may be obtained during 20–30 minutes at a temperature of 130° C. but it will be understood that the drying effect may also take place at a lower temperature if the drying time is prolonged correspondingly (as an example at 50° C. in 3–10 hours).

When using an electric cooking plate of 500 watt, 30 gr. of humidity is removed from an active substance of 80 gr. during 15 minutes. The speed of removing the humidity depends upon the transfer of heat to the active substance. The process is facilitated when using a cooking plate by making the bottom as flat as possible. Further the bearer may be divided into cells 5 by means of heating ribs 6 in order to secure an effective transfer of heat to the substance.

The bearer may be filled with more or less drying substance 4 and may be produced in several sizes. To dry a rubber shoe there is required only about 30 to 40 gr. silica gel whereas for heavy boots up to 100 gr. is required.

In order that the dry active substance should not take up humidity from the air and become inactive again before its use, the bearer may be provided with a tight cover 10 and a very tight bottom 8 and may be stored in a suitable casing 9 having the tight cover 10.

In order to indicate the contents of humidity and the activity of the substance an indicating substance may be added as an example a salt of cobalt, which causes a deep blue colour in dry state and a red colour when saturated with humidity.

The advantage of using silica gel consists in removing also odour simultaneously with the removal of humidity.

I claim:

1. In a device for drying shoes and boots from the inside, a bearer having a penetrable surface and containing a hygroscopic substance capable of reactivation and heat conducting ribs on the bearer for dividing the bearer into cells.

2. In a device for drying shoes and boots from the inside, a bearer containing a hygroscopic substance capable of reactivation, heat conducting ribs dividing the bearer into cells, and an outer surface covering for the bearer composed of wire gauze.

3. In a device for drying shoes and boots from the inside, a bearer made of aluminium and having a penetrable surface and containing a hygroscopic substance capable of reactivation and aluminium ribs on the bearer for dividing the bearer into cells.

LEIF HANS LARSEN TRONSTAD.